(No Model.)

A. E. RUTTER.
RAIL JOINT.

No. 410,028. Patented Aug. 27, 1889.

WITNESSES
Walter H. Pumphrey
Geo. G. Hooke

INVENTOR
Allen E. Rutter
by Johnston Reinohl & Dye
Attorneys

UNITED STATES PATENT OFFICE.

ALLEN E. RUTTER, OF SALEM, OHIO, ASSIGNOR OF ONE-HALF TO JOHN A. GAMBLE, OF SAME PLACE.

RAIL-JOINT.

SPECIFICATION forming part of Letters Patent No. 410,028, dated August 27, 1889.

Application filed April 10, 1889. Serial No. 306,697. (No model.)

*To all whom it may concern:*

Be it known that I, ALLEN E. RUTTER, a citizen of the United States, residing at Salem, in the county of Columbiana and State of Ohio, have invented certain new and useful Improvements in Rail-Joints; and I do hereby declare the following to be a full, clear, and exact description of the invention, such as will enable others skilled in the art to which it appertains to make and use the same.

My invention relates to rail joints or couplings, and has special reference to that class requiring great strength and durability, such as those used for joining the abutting ends of railroad-rails.

The invention will be hereinafter described, and particularly pointed out in the claims.

Figure 1:
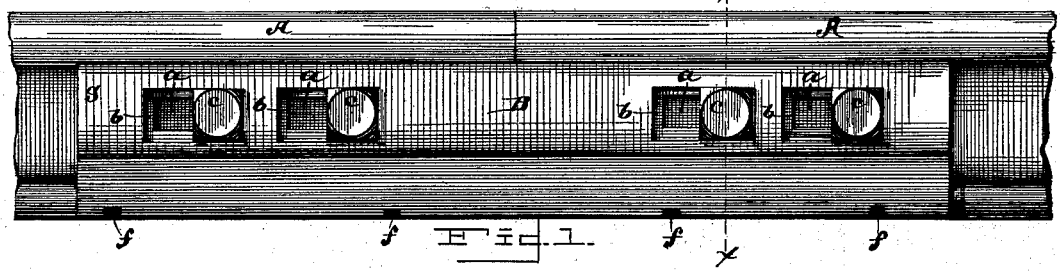
Figure 2:
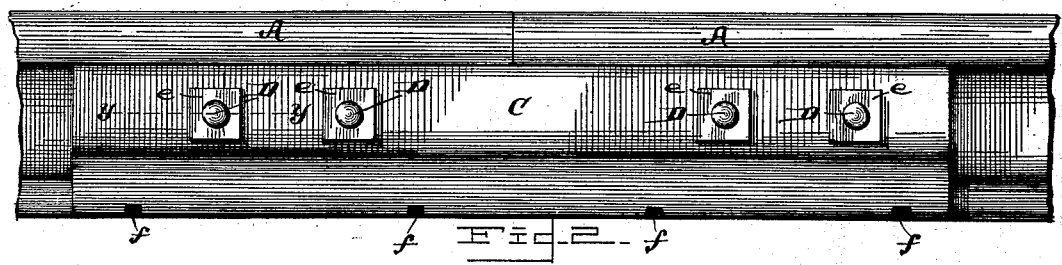
Figure 3:
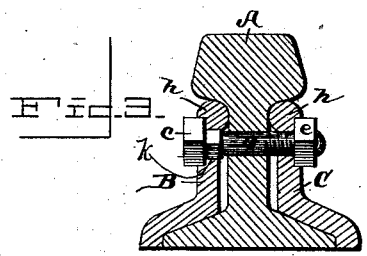
Figures 4, 5:
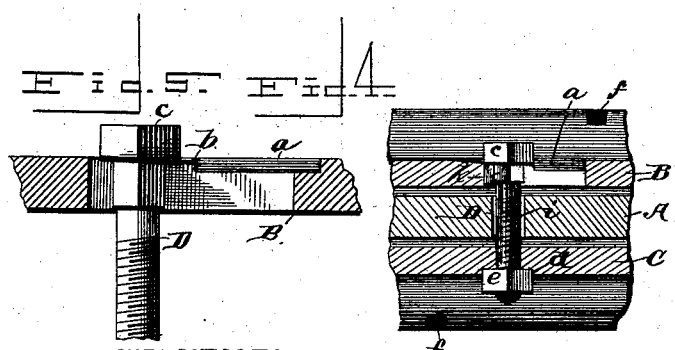

In the accompanying drawings, which form part of this specification, Figure 1 represents a side elevation of one of the fish-plates constituting part of my invention as applied to a rail; Fig. 2, a similar view of the opposite fish-plate; Fig. 3, a vertical sectional view of both fish-plates and rail, taken on line $x\ x$ of Fig. 1; Fig. 4, a longitudinal section of same on the line $y\ y$ of Fig. 2, and Fig. 5 an enlarged detail view showing a horizontal section of one of the plates.

Reference being had to the drawings and the letters thereon, A indicates two sections of ordinary H-rails; B C, two fish-plates which constitute my invention, and D bolts for securing parts A B C together. The rails A are punctured at proper intervals with slightly-elongated bolt-holes to serve in securing the parts together and allow of the usual expansion and contraction of the rails with changes of temperature, in a manner hereinafter described. The fish-plate B is provided with a series of horizontal rectangular slots $a$, having shoulders $b$ formed therein, which serve as seats for the heads $c$ of bolts D, and are all inclined in the same direction for the purpose of wedging up the parts after joining, as will also be described. The fish-plate C is similar to plate B in its configuration and has formed in its outer surface, opposite the openings $a$ in plate B, recesses $d$, for the purpose of countersinking the nuts $e$ on the bolts D. Both fish-plates are provided with small slots $f$ in their lower edges, through which they are spiked down to the sleeper or tie of the road-bed after the plates B and C and the rails A have been secured in their relative positions. The bolt-heads $c$ on the bolts D are beveled to the same angle as the inclines $b$, in which they rest, thus providing for a firm bearing between said parts, and the necks of said bolts are squared, as at $k$, for the purpose of engaging with the sides of slots $a$, as shown in Figs. 3 and 4.

The several parts being substantially as described, their construction and operation are as follows: Fish-plates B and C having been placed on either side of the abutting ends of two sections of rail, bolts D are passed, first, through the rectangular slots $a$ in plate B, then through a slightly-elongated slot $i$ in the rail A, and, finally, through recesses $d$, when the bolt-heads $c$ will rest in the lowest part of inclines $b$, in which position the nuts $e$ may be screwed up snug with the outer surface of plate C. Plate C is then spiked down and plate B served with a stroke from a sledge on the end thereof marked $g$, which drives said plate B along bodily in a direction parallel with the rails and has the effect of drawing the nuts $e$ close into the recesses $d$. The bolt-heads $c$ travel up the inclines $b$ to near the surface of slots $a$, in which position it is obvious that both bolt-heads $c$ and nuts $e$ are countersunk, and thus prevented from turning accidentally. The fish-plate B is now secured to the sleepers by spikes passing through slots $f$ in its base, which completes the construction, and the device forms a secure joint or coupling, or, if applied midway between the ends of a rail, just as satisfactory chair or seat.

In adjusting the fish-plate B it is desirable that the inclines $b$ be arranged so that the depth of the inclines decrease with the direction of travel—that is, the plate B should always be placed on the left-hand side of the track, so that the "creeping" of the rails will tend to join the coupling tighter by forcing the bolt-heads $c$ farther up the incline, rather than to loosen it.

By reference to Fig. 3 it will be observed that the plates B C do not fit close to the web of the rail, being prevented by an enlargement $h$, on the upper inside thereof, bearing against the web close under the head of the rail. This arrangement gives to the sides of plates B C a spring, which aids materially in locking the nut after it has been drawn up into place. It will also be observed that, although the parts are thus securely locked, they do not prevent a slight separation of the rails to provide for expansion and contraction, as the bolt-holes $i$ in said rails are slightly elongated, as shown in Fig. 4, for this purpose.

Having thus fully described my invention, what I claim is—

1. In a railroad-rail joint, a fish-plate on each side of the rails, having recesses, in combination with a bolt and nut constructed to fit into said recesses and lock the former in place, substantially as described.

2. In a railroad-rail joint, a fish-plate provided with a rectangular recess, having inclines and a seat for the bolt-head, and a bolt and nut, in combination with a plate on the opposite side of the rails, having a recess to receive the nut of a bolt and secure it against turning, substantially as described.

3. In a railroad-rail joint, a bolt having a head provided with an inclined inner surface, and a nut, in combination with a fish-plate having a recess provided with an inclined surface, and a plate having a recess to receive the nut of the bolt, substantially as described.

In testimony whereof I affix my signature in presence of two witnesses.

ALLEN E. RUTTER.

Witnesses:
   J. A. GAMBLE,
   JOSEPH FAUCETT.